United States Patent [19]

Evans

[11] 4,045,862
[45] Sept. 6, 1977

[54] ELECTRONIC COMPONENT AND METHOD
[75] Inventor: William J. Evans, Indianapolis, Ind.
[73] Assignee: P. R. Mallory & Co., Inc., Indianapolis, Ind.
[21] Appl. No.: 322,403
[22] Filed: Jan. 10, 1973
[51] Int. Cl.$^2$ .............................................. H01G 9/10
[52] U.S. Cl. .......................................... 29/570; 53/36
[58] Field of Search ..................... 29/470.1, 602, 627, 29/570; 53/36; 228/1

[56] References Cited
U.S. PATENT DOCUMENTS

| | | | |
|---|---|---|---|
| 2,047,260 | 7/1936 | Franklin | 53/36 |
| 2,671,264 | 3/1954 | Pessel | 339/275 R X |
| 2,902,577 | 9/1959 | Brown | 228/1 X |
| 3,349,295 | 6/1965 | Sparkes | 29/570 |
| 3,573,139 | 3/1973 | Mori et al. | 228/1 X |
| 3,648,337 | 3/1972 | Greskamp et al. | 29/570 |
| 3,680,203 | 8/1972 | Braiman et al. | 29/570 |
| 3,815,219 | 6/1974 | Wilson | 29/498 X |

Primary Examiner—Roy Lake
Attorney, Agent, or Firm—Hoffmann, Meyer, & Coles

[57] ABSTRACT

A means for and method of closing an opening in a body housing electrical component means having external terminal means. The means for and method of closing the body includes immersing in a bath the body having an opening communicating with a void in the body and electrical component means in the void in the body. The body immersed in the bath has the void filled with material of the bath thru the opening. While immersed in the bath, the body is contacted with means for closing the opening of the body so as to retain the electrical component means and material of the bath within the body. The closed body with the electrical component means and material of the bath is then removed from the bath.

The means and method have particular applicability to closing open ends of plastic bodies housing electronic components such as capacitors while the bodies and components are immersed in a bath of liquid material. In the event the electronic component is a paper type capacitor, the bath is a liquid material such as oil or wax-oil compounds having a high dielectric constant. Preferably, the open ends of the plastic bodies are closed by ultrasonically welding plastic material to the plastic bodies to close the open ends of the bodies while the bodies and their cooperatively associated electronic components are immersed in the liquid bath.

5 Claims, 4 Drawing Figures

ELECTRONIC COMPONENT AND METHOD

The present invention relates means for and method of closing an opening in a body housing electrical component means, and, more particularly, to closing, while immersed in a bath, an open end of a plastic body housing electrical component means.

The electrical component cooperatively associated with the housing may be any suitable electrical component such as a capacitor, resistor, inductor, battery, diode, transistor and the like. However, in the interest of a clearer showing of the concepts hereinafter described, the concepts will be described with reference to a paper type capacitor. Nevertheless, it should be appreciated that the concepts are also applicable to other types of electrical components.

A paper type capacitor typically includes alternate layers of paper such as Kraft paper and metallic foil such as aluminum foil convolutely wound into a tight roll. The convolutely wound roll is vacuum impregnated with a mineral oil or suitable synthetic liquid material having a high dielectric constant to improve the operating performance of the paper type capacitor. The convolutely wound roll is then inserted in a housing to provide physical protection for the roll and, just as importantly, to help minimize contamination of the roll by means such as moisture and the like which can have a harmful effect on the electrical characteristics of the paper type capacitor. The open end of the metal housing can be hermetically sealed or sealed by a metallic cap. The selection of housing material for the paper type capacitor has an effect on the life of the capacitor. For example, small amounts of moisture gaining entrance to the capacitor at any time during manufacture that are not removed in some fashion can have harmful effects on the electrical characteristics of the capacitor.

Typically, hermetically sealed metallic housings for paper type capacitors are expensive, but, nevertheless, they are excellent housings from the standpoint of helping to minimize the ingress of contaminants such as moisture to the capacitor after the housing is hermetically sealed. A less expensive paper type capacitor is a metallic housing having its open end closed by a metallic seal. The metallic seal is compressively retained by a suitably swaged or rolled-over edge portion of the housing. Ideally, a paper type capacitor in a metallic housing has its open end closed in an atmosphere which is as relatively free of harmful contaminants. Prior to closing the open end of the metallic housing for the paper type capacitor, the housing is filled with oil or an oil-wax compound having a high dielectric constant so as to improve the operating performance of the paper type capacitor. Typically, providing the housing with oil or an oil-wax compound is accomplished by filling the housing through an aperture in the seal (hermetic or metallic) and closing the aperture in the seal with a plug.

Another disadvantage of the paper type capacitor is the terminal construction usually associated therewith. The terminal construction includes at least two separate parts, joined together to form the terminal. The two separate parts are an external L-shaped terminal and an electrical feed-thru, rivet-like means that projects through an aperture in the terminal and is swaged. Should the pressure used during the swaging operation be excessive, harmful cracking of the seal may occur; should the pressure used during the operation be inadequate, leakage of atmosphere into the capacitor housing through the terminal may occur.

A feature of the present invention is directed to closing the open end of a housing through which electrical component means has been inserted into a void of the body while the body is immersed in a bath. Another feature of the invention is to provide a means for and a method of closing the open end of a housing for an electrical component such that the ingress of contaminants to the interior of the housing is minimized during the closing operation. Preferably, the housing and the means for closing the open end of the housing are of plastic material and ultrasonic forces are used to join the means for closing the opening to the housing while the housing is immersed in a liquid bath. A further feature of the invention is a molded electrical feed-thru terminal assembly. Other features of the invention will be apparent from the drawing, the following description and the appended claims.

Figure 1:
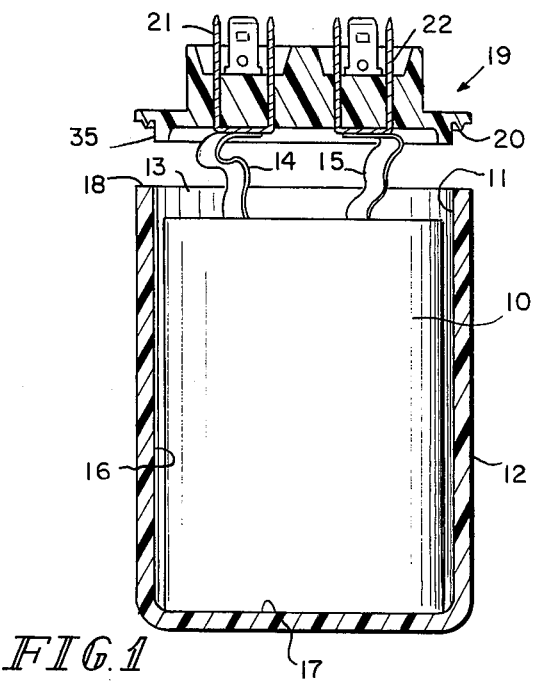
FIG. 1 is an enlarged, exploded cross sectional view of a paper type capacitor just prior to closing the open end of the capacitor housing.

One form of an electrical component embodying the concepts of the present invention is illustrated in FIG. 1. The electrical component 10, a convolutely wound paper type capacitor roll, is suitably positioned or seated in void 11 of housing 12. The electrical component 10 is inserted into the void 11 through open end 13 of the housing 12.

The construction of a paper type capacitor can vary widely. The species shown in FIG. 1 is a non-polar type capacitor and includes alternate layers of Kraft paper (not shown) and aluminum foil (not shown) convolutely wound into a tight roll to provide electrical component 10. Adjacent aluminum foils (not shown) include outwardly projecting tabs 14 and 15. One of the tabs serves as the inner winding tab of the paper type capacitor roll 10 whereas the other tab serves as the outer winding tab of the paper type capacitor. U.S. Pat. No. 3,648,337 and U.S. Pat. No. 3,680,203 show convolutely wound paper type capacitors and disclose methods of making such capacitors.

Housing 12 may be formed from any suitable dielectric material that is economical, structually strong, chemically inert to the materials contained withing the housing and that can be welded to another material. Such materials are thermoplastic materials including but not limited to polypropylene, polyamide, polystyrene, polycarbonate, and polyacetate resins and nylon. The housing 12 includes an elongated, curved side wall 16 closed at one end by an end wall 17. The end wall 17 opposite the open end 13 and the side wall 16 cooperate to define the void or cavity 11. The side wall 16 terminates at open end 13 which defines an annular lip 18.

Means 19 for closing the open end 13 of the housing 12 is preferably of the same thermoplastic material as is the housing. The means 19 has the configuration of the lip 18, that is, if the lip is annular, means 19 is annular; if the lip 18 is oblong, means 19 is oblong etc. Preferably, the means 19 includes several features such as an annular V-type energy director 20 to concentrate the energy used to join the means 19 to the housing 12 on the lip 18. Means 19 also includes an annular locating shoulder 35 suitably dimensioned to abut with the side wall 16 of the void 11 in the manner shown in FIG. 4.

External electrical termination for the electrical component 10 is achieved by U-shaped terminal means 21 and 22. The U-shaped terminal means 21 and 22 are retained in the means 19 by forming softened thermoplastic material of the means 19 around the terminal means 21 and 22 prior to the thermoplastic becoming rigid. It should be appreciated that a closure is formed around the terminal means without a swaging operation. Prior to closing the open end 13 of housing 12, tabs 14 and 15 are attached to the terminals 21 and 22, respectively, by any suitable means such as by welding the free ends of tabs 14 and 15 to the respective bases of the terminals 21 ans 22.

Figure 2:
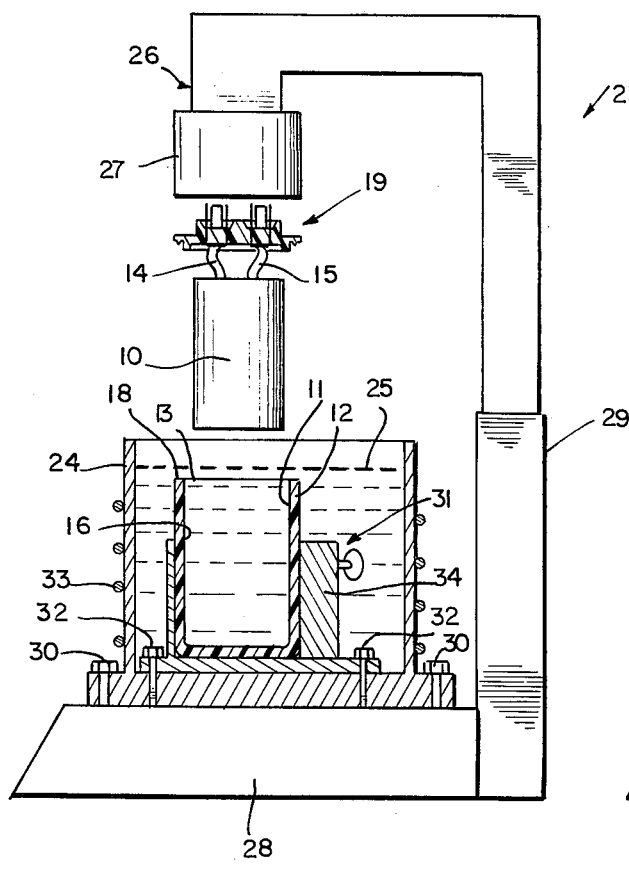
FIG. 2 is a diagramatic illustration of the paper type capacitor of FIG. 1 immersed in a bath and ultrasonic welding equipment used to assist in closing the open end of the housing for the paper type capacitor.
Figure 3:
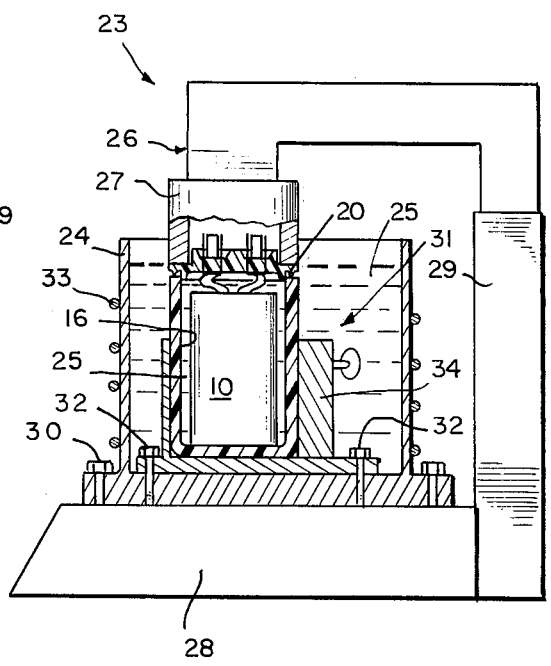
FIG. 3 is a diagramatic illustration of the equipment in position to assist in closing the open end of the housing for the paper type capacitor.

Referring now to FIGS. 2 and 3, a diagramatic illustration of means 23 used to join the means 19 to the lip 18 to close the open end 13 of housing 12 is illustrated. FIG. 2 shows the housing 12 for the paper type capacitor roll 10 immersd in a bath 24. Note that liquid 25 of the bath fills space of the void 11 not occupied by the paper type capacitor roll 10 by flowing thru open end 13 of the housing 12. By immersing the entire housing 12 in the bath 24, the entire unoccupied void 11 of the housing is filled by the liquid 25 of the bath.

A suitable means to accomplish joining of means 19 for closing open end 13 to the lip 18 of housing 12 is ultrasonic welding means 26. The ultrasonic welding means 26 includes a vibrator welding head or horn means 27 connected to an alternating current supply (not shown), base 28, and support frame 29 for properly positioning welding horn means 27 with respect to the parts to be welded. Welding horn means 27 is brought into contact with means 19 in the manner shown in FIG. 3 with the proper time of exposure, amount of pressure applied and ultrasonic vibration frequency to weld the thermoplastic parts together. The close contact between the V-shaped energy director 20 and the lip 18 at the open end 13 and the friction generated by the high frequency vibration in the two parts at points of contact therebetween causes the two parts to join together without the use of welding current. It should be recognized that if the thermoplastic material does not transmit vibrations, efficiently, limited joining of the parts occurs. The geometry of the joint also affects weld strength and quality. The amount of power delivered to the parts helps determine the speed and quality of a weld. Ultrasonic plastic welding appears to apply only to thermoplastic since thermoset resins tend to decompose when heated.

Positioned on base 28 and secured thereto by suitable fastening means such as bolts 30 is the bath 24 which holds a suitable bath material 25. For paper type capacitors, a suitable bath material 25 is a liquid such as mineral oil, wax-oil, compound or similar synthetic material having a high dielectric constant. A heating element 33 circumscribes the bath 24 and is used to elevate the temperature of the bath material 25 to a temperature of about 100° C during closing of open end 13 of the housing 12. Disposed in the bath 24 and below the level of the liquid 25 is a holder 31. The holder 31 is secured to the bottom of the bath by suitable fastening means such as screws 32 and is provided with an adjustable gripping plate 34 for suitably retaining the housing 12 during closing of the open end 13 of the housing.

Figure 4:
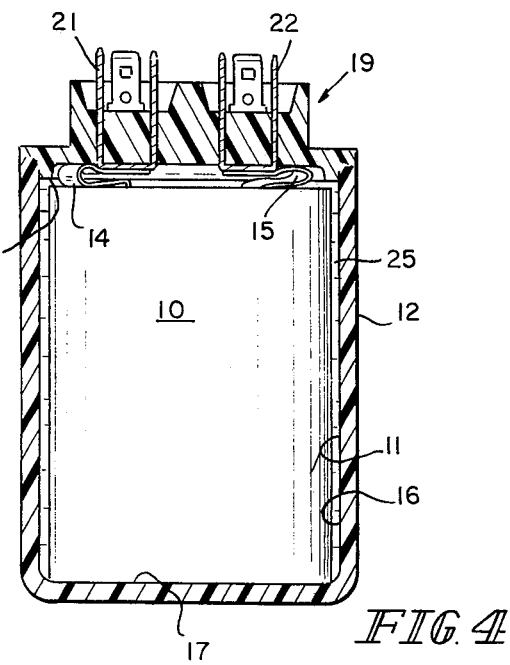
FIG. 4 is an enlarged cross sectional view of a paper type capacitor having its open end closed using the concepts of the invention.

Illustrated in FIG. 4 is a cross sectional view of the housing 12 after means 19 has been ultrasonically welded to lip 18 of the housing and also shows a portion of the liquid 25 of bath 24 sealed therein.

For purposes of illustration and not for limitation the following example is given.

Bath 24 is filled with mineral oil 25 to the level illustrated in FIGS. 2 and 3. The holder means 31 is then adjusted to hold the open end 13 of housing 12 upwardly with gripping plate 34 adjusted to retain the housing 12 in position during the closing operation. The housing 12 and electrical component 10 in the void 11 of the housing is immersed in the liquid 25 of the bath 24. Immersing housing 12 with electrical component 10 in the void 11 in bath 32 causes liquid of the bath to flow into void 11 of the housing and fill the void 11 not occupied by the electrical component. Housing 12 is secured in holder 35. The temperature of the liquid 25 is raised to a temperature at approximately 100° C.

With housing 12 position in bath 32 as shown on FIG. 3 and energy director means 20 in contact with the annular lip 18 of the housing 12, ultrasonic vibrator horn 27 is lowered into the contact with the upper surface of means 19. The horn 27 is vibrated at about 20,000 vibrations per second. Sufficient pressure is exerted by horn 27 on the means 19 to establish an ultrasonic wave path. The discontinuity at the interface between the energy director means 20 of the means 19 and the lip 18 of the housing 12 generates a sufficient amount of friction to melt sufficient amounts of the energy director and the lip 18 to cause joining therebetween. The time and frequency of vibration associated with closing process varies depending on a number of factors including on the type of thermoplastic material of the housing 12 and means 19, the material of the bath, and the shape of the horn 27.

A preferred material for housing 12 and means 19 for closing the housing is polypropylene. The housing 12 and means 19 should be of the same material as dissimilar materials do not respond well to ultrasonic welding.

It is seen that closing the open end 13 of housing 12 while immersed in a liquid bath helps to completely fill an area defined by wall 16, bottom 17 and closure means 19 to minimize ingression of contaminants into the housing and to reduce the possibility of any air or contaminants from being sealed in the area during closing operation.

As closing of the open end 13 of the housing 11 is realized, the liquid 25 in void 11 is slightly compressed due to the configuration of means 19. Compressing the liquid 25 in the void 11 tends to aid in the saturation of the paper with the liquid.

It is recognized that means other than an ultrasonic plastic welding means can be used to join means 19 to the lip 18 of housing 12 to close the open end 13 of the housing.

While the invention is illustrated and described in presently preferred embodiments, it will be understood that variations and modifications may be effected without departing from the concepts of the invention.

I claim:

1. A method of closing and sealing an open end of a body housing electrical component means having external terminal means, the method comprising the steps of immersing in a bath a body having an open end connected to a void in the body and electrical component means in the void in the body, filling the void of the body immersed in the bath thru the open end with material of the bath, contacting the immersed body with means for closing and sealing the open end of the body to retain the electrical component means and material of the bath within the body, initiating bonding of a continuous substantially V-shaped means of the means for closing and sealing the open end of the body to a continuous lip circumscribing the open end of the body prior to finally positioning the means for closing and sealing the open end of the body with respect to the body, compressing material of the bath in the void of the body during the bonding together of the body and the means for closing and sealing the open end of the body by means carried by the means for closing and sealing the open end of the body while the body and the means are immersed in the bath, and removing from the bath the bonded together body and means for closing and sealing the open end of the body with the electrical component means and material of the bath.

2. The method of claim 1, wherein the body and the means for closing and sealing the open end of the body are each thermoplastic.

3. The method of claim 2, wherein the step of bonding together the body and the means for closing and sealing the open end includes ultrasonically bonding the body to the means for closing and sealing the open end of the body.

4. The method of claim 2, wherein thermoplastic material of the body and of the means for closing and sealing the open end of the body are substantially the same material.

5. The method of claim 1, wherein the means carried by the means for closing and sealing the open end of the body includes a shoulder adapted to project into the void of the body.

* * * * *